US006295524B1

(12) United States Patent
Yianilos et al.

(10) Patent No.: US 6,295,524 B1
(45) Date of Patent: *Sep. 25, 2001

(54) LEARNING EDIT DISTANCE COSTS

(75) Inventors: Peter N. Yianilos; Eric Sven Ristad, both of Princeton, NJ (US)

(73) Assignees: NEC Research Institute, Inc.; Princeton University, both of Princeton, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/740,463

(22) Filed: Oct. 29, 1996

(51) Int. Cl.[7] .................................................. G06F 15/18
(52) U.S. Cl. ............................................................ 706/12
(58) Field of Search ................................................ 706/12

(56) References Cited

U.S. PATENT DOCUMENTS

| 4,845,610 | * | 7/1989 | Parvin ..................................... 712/17 |
| 5,459,739 | * | 10/1995 | Handley et al. ....................... 714/797 |
| 5,757,959 | * | 5/1998 | Lopresti ................................ 382/186 |
| 5,761,538 | * | 6/1998 | Hull ...................................... 395/899 |
| 5,774,588 | * | 6/1998 | Li ......................................... 382/230 |
| 5,832,474 | * | 11/1998 | Lopresti et al. ......................... 707/2 |

OTHER PUBLICATIONS

D. Smith and E. Pierzchala, "An Algorithm and Architecture for Approximate String Matching," Proc. 33rd Midwest Symposium on Circuits and Systems, vol. 2, pp. 736–739, Aug. 1990.*

H. Bunke and J. Csirik, "Inference of edit costs using parametric string matching," Proc. 11th IAPR Int'l. Conf. on Pattern REcognition, pp. 549–552, Sep. 1992.*

E.J. Ciaccio, et al., "Biosignal Pattern Recognition and Interpretation Systems," IEEE Engineering in Medicine and Biology, pp. 129–135, Feb. 1994.*

H. Bunke and J. Csirik, "Parametric String Edit Distance and its Application to Pattern Recognition," IEEE Trans. on Systems, Man, and Cybernetics, vol. 25(1), pp. 202–206, Jan. 1995.*

J.D. Golic and S.V. Petrovic, "Correlation Attacks on Clock–Controlled Shift Registers in Keystream Generators," IEEE Trans. on Computers, vol. 46(4), pp. 482–486, Apr. 1996.*

H. Bunke and J. Csirik, "Edit Distance of Run–Length Coded Strings", Proceedings of the 1992 ACM/SIGAPP Symposium on Applied Computing: Technological Challenges of the 1990's, 137–43, Mar. 1992.*

A. Weigel and F. Fein, "Normalizing the Weighted Edit Distance", Proceedings of the 12th IAPR International Conference on Pattern Recognition: Computer Vision & Image Processing, 399–402, Oct. 1994.*

A. Weigel et al., "Lexical Postprocessing by Heuristic Search and Automatic Determination of the Edit Costs", Proceedings of the Third International Conference on Document Analysis and Recognition, 857–60, Aug. 1995.*

H. Bunke, "A Fast Algorithm for Finding the Nearest Neighbor of a Word in a Dictionary", Proceedings of the Second International Conference on Document Analysis and Recognition, 632–37, Oct. 1993.*

(List continued on next page.)

Primary Examiner—Kakali Chaki
(74) Attorney, Agent, or Firm—Philip J. Feig

(57) ABSTRACT

Edit distance costs or similarity of two data strings is optimized, or the costs are minimized, based upon a learning algorithm using examples of similar strings, i.e. learning data. In this manner, the costs are learned rather than being a predetermined fixed or engineered table of entries.

10 Claims, 4 Drawing Sheets

OTHER PUBLICATIONS

D.T. Hoang, "Searcing Genetic Databases on Splash 2", Proceedings of the IEEE Workshop on FPGAs for Custom Computing Machines, 185–91, Apr. 1993.*

H. Bunke and J. Csirik, "Inference of Edit Costs Using Parametric String Matching", Proceedings of the 11th IAPR International Conference on Methodology and Systems, 549–52, Aug. 1992.*

E. Vidal et al., "Fast Computation of Normalized Edit Distances", IEEE Transactions on Pattern Analysis and Machine Intelligence, 899–902, Sep. 1995.*

H. Bunke and J. Csirik, "Parametric String Edit Distance and its Application to Pattern Recognition", IEEE Transactions on Systems, Man and Cybernetics, 202–06, Jan. 1995.*

A. Marzal and E. Vidal, "Computation of Normalized Edit Distance and Applications", IEEE Transactions on Pattern Analysis and Machine Intelligence, 926–32, Sep. 1993.*

Microsoft Press, Computer Dictionary: Third Edition, 451, 1997.*

Merriam Webster's Collegiate Dictionary: Tenth Edition, 161, 663, 1997.*

Joseph B. Kruskal et al., "An Overview of Sequence Comparison", Time Warps, String Edits, and Macromolecules the Theory and Practice of Sequence Comparison, Addison–Wesley Pub. Co. 1983, pp. 1–43.

Hall et al., "Approximate String Matching", Computing Surveys, vol. 12, 1980, pp. 381–402.

NEC Research Institute, Inc. Technical Report, "Finite Growth Models", TR #96–074, Aug. 1996.

* cited by examiner

LEARNING EDIT DISTANCE COSTS

FIELD OF THE INVENTION

The present invention relates to data string comparisons and specifically to the learning of optimal costs for string edit distances. The invention has application in varied fields, including speech recognition, database retrieval and molecular biology to compare DNA sequences.

BACKGROUND OF THE INVENTION

In the art of edit distance matching or dynamic programming matching, it is known that if there are two data strings that are different, it is useful to measure how similar or different the data strings are. Edit distance between two finite strings over a finite alphabet finds the least costly way to transform the first string into the second string into the second string by single-symbol insertions, deletions and substitutions each with a predetermined cost stored in a table in memory.

These prior art methods can be thought of as a black box into which two strings are applied as inputs along with a predetermined cost table. The box's output is a number representing the least costly way to transform the first string into the second.

SUMMARY OF THE INVENTION

The present invention improves the process for determining the edit distance costs or similarity of two data strings by introducing a procedure optimizing or minimizing the cost based upon a learning algorithm relying upon examples of similar strings, i.e. learning data. The procedure begins with a computer, a training list of string pairs and a memory containing an initial cost table. An algorithm causes the memory to provide an improved cost table with reference to the training list and the initial cost table. In this manner, the cost table is learned (from the training list of string pairs) rather than being a predetermined fixed or engineered table of entries. The table output is improved based on the sense of the summer distance between each training pair.

This process may be repeated to further improve the cost table using the previously learned cost table as the initial cost table. Edit distance has many widespread applications, the present invention provides a simple method to learn costs which may improve performance in many applications.

A principal object of the invention is the provision of a method of learning costs of string edit distances.

Further and still other objects of the invention will become more clearly apparent when the following description is read in conjunction with the accompanying drawing.

DETAILED DESCRIPTION OF THE INVENTION

The most common notion for edit distance between two finite strings s, t over finite alphabet $\Sigma$, finds the least costly way to transform s into t via single-symbol insertions, deletions, and substitutions. The non-negative costs of these primitive edit operations are parameters to an algorithm. In practice the costs depend on the problem domain, and may be represented as a single table $c_{i,j}$ of size $|\upsilon|+1 \times |\upsilon|+1$, where row and column 0 correspond to an additional alphabet member $\epsilon$ representing the null character. See FIG. 1. The entry in table position i,j gives the cost of substituting symbol j of s for symbol i or t. The first row gives insertion costs, the first column gives deletion costs, and the remaining entries specify substitution costs. The table need not be symmetric. Recall that a simple dynamic program finds the edit distance in $O(|s| \cdot |t|)$ time. See Sankoff and Kruskal, "Macromolecules: The Theory and Practice of Sequence Comparions," Addison-Wesley (1983) for a thorough treatment of string edit distance, or an article by Hall and Dowling, entitled "Approximate String Matching" in Computing Surveys, Vol 12, 1980, pages 381–402, for a more compact discussion.

Rather than imagining an editing process that transforms s into t, we equivalently imagine that the pair (s, t) is grown in a series of steps of three kinds: joint steps, left steps, and right steps. This outlook was first introduced in section 3.2.2 Hall and Dowling, supra. The present invention's contributions, which was not contemplated by Hall and Dowling, is the further development of this viewpoint to include the learning of costs, and the construction of more sophisticated distance functions as described below. The initial state of the process is $(\emptyset\emptyset)$, where $\emptyset$ denotes the null string. A joint step concatenates symbols to both elements of the pair. A right step adds a symbol to only the right element of the pair, while a left step adds a symbol to the left element. In the language of string edit distance, a joint step corresponds to a substitution operation. When a joint step addes the same symbol to both strings, a symbol is substituted for itself. A right step corresponds to an insertion operation, and a left step corresponds to a deletion operation.

The task of learning as optimal cost table is clearly under-constrained, because the string edit distance for all strings may be trivially minimized by setting all edit costs to zero. The present outlook is stochastic and therefore each cost is interpreted as $-\log_2()$ of the corresponding event probability. For example, as entry in the top row expresses the probability of choosing to insert a particular symbol into the left string. The natural constraint then requires the probabilities that underly the cost table must sum to one. Expressed in terms of cost $c_{i,j}$, this translates to:

$$\sum_{i,j} 2^{-c_{i,j}} = 1$$

Figures 1, 2:
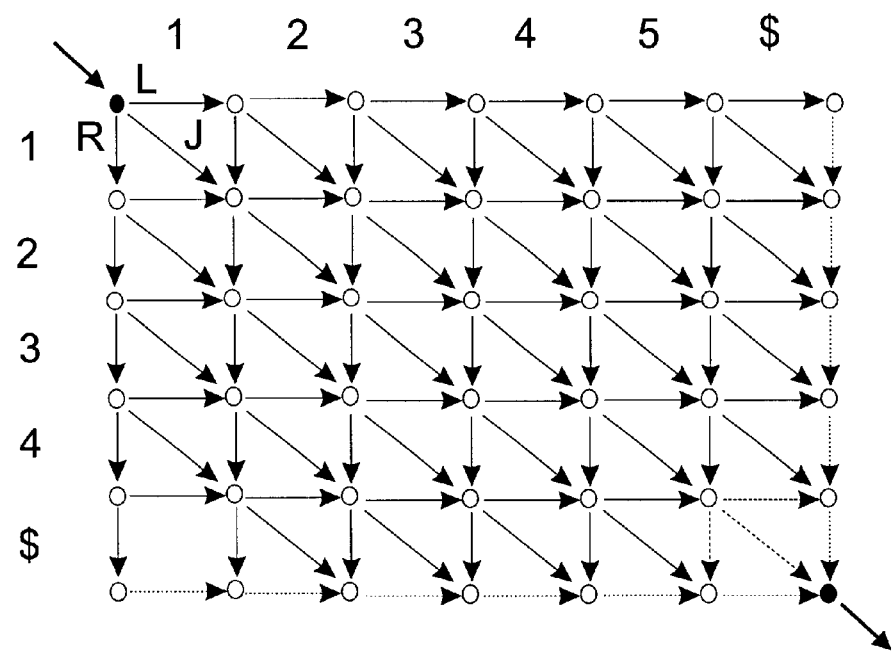
FIG. 1 is an augmented table of edit distance probabilities.
FIG. 2 is a finite growth model DAG corresponding to computation of the edit distance between strings of length 4 and 5.

For technical reasons which will be clarified later, it is necessary to introduce the '$' symbol as a second extension to the alphabet. This adds an additional row and column to the cost table. FIG. 1 depicts the table after conversion to probabilities. The zero entries correspond to infinite costs. We done $x_{i,j}$ the cost table in probabilistic form. The stochastic choice between left, right, and joint generation is implicit in this table. That is, $\chi$ combines transition and observation probabilities. For example, the sum of the top row may be interpreted as the probability of choosing to perform a left insertion. The table sums to one and the corresponding edit costs are $-\log_2()$ of its value.

The "stochastic edit distance" between strings s and t is $-\log_2(Pr((s, t)|\chi)$. Here the probability refers to the infinite generative stochastic process in which symbols are inserted at the end of the right string, or at the end of the left string, or jointly at the end of both. Specifically, it is the probability that pair (s, t) will occur as an intermediate stage of generation, during a random trial. The process is parameterized by table $\chi$ giving the probability of these events, as described herein.

The $-\log_2()$ operation converts the probability to a non-negative "distance", which as shown below corresponds closely to the standard notion of edit distance. Also notice that in the definition, reference is made to the probability of the ordered pair (s, t). This is an important distinction since $\chi$ need not be symmetric, and it might be that $\Pr((s, t)|\chi) \neq \Pr((t, s)|\chi)$. It is also possible to interpret $\Pr((s, t)|\chi)$ with respect to a finite event space—namely the set of all string pairs with the same combined length as (s, t). That is, the sum of the probabilities of all such strings is one. This is seen by observing that the events $\{G_{a,b}\}$ consisting of the generation of an intermediate result having lengths a, b where $a+b=|s|+|t|$, are mutually exclusive and exhaustive.

FIG. 2 shows that the FGM (Finite Growth Model) corresponding to stochastic edit distance between strings of length 4 and 5. Its 3-way branching pattern from the structure of the imagined growth process, and matches exactly the dependency structure of the dynamic program for conventional edit distance. The finite growth model (FGM) for strings of arbitrary fixed length is an obvious generalization.

The role of '$' is effectively truncate the stochastic process, so that computation of $\Pr((s, t)|\chi)$ is done as efficiently as possible. Before evaluation the probability of (s, t) using the FGM, we add '$' to the end of both, resulting in the pair ($s^+$, $t^+$). The FGM is then designed so that the probability of this modified pair as computed by the FGM, is exactly $\Pr((s, t)|\chi)$. Notice that all but the bottom and rightmost vertices have ternary outdegree, and that the edges leading them are drawn with solid lines. These are all tied, and both their choice and observation models are specified by $\chi$, corresponding to normal operation of the generative stochastic process. Referring to the vertices and edges along the right column and bottom row of FIG. 2—excluding the sink, in order to reach one of them from the FGM's interior, whether by single or joint generation, a '$' must be observed. But as shown in FIG. 1, the row and column corresponding to '$' is entirely zero. These edge vertices must then have zero $\alpha$ values, and therefore make no contribution to the $\alpha$ of the sink. This is true for any observation model that might be attached to them. Next consider the sink's diagonal predecessor, and observe that the edges leaving it are drawn with a dashed line. The choice model for this vertex selects the diagonal outgoing edge with probability one. That edge's observation model selects joint generation of a pair of '$' symbols, with probability one. The sink's $\alpha$ value is then identical to that of its diagonal predecessor, which is $\Pr((s, t)|\chi)$. In this way truncation of the stochastic process is effected.

The stochastic edit distance $-\log_2 \Pr(s, t)|\chi)$ is related, but not identical to conventional edit distance. If stochastic table $\chi$ is converted by $-\log_2()$ to a table of non-negative costs, then conventional edit distance corresponds to the log-probability of the single best path through the FGM—and is sometimes called the Vitterbi decode in the HMM literature. Stochastic edit distance is the sum over all paths. Basing decisions on the Vitterbi decode is analogous to focusing on the mode of a distribution while stochastic edit distance corresponds to the mean. In the classification systems it is expected that both forms will lead to nearly identical decision, but predict that stochastic edit distance may be slightly superior. The improved costs as described below will provably reduce stochastic edit distance, and in practice should improve results for the conventional form as well.

Algorithms

The application of FGMs to stochastic edit distance is formalized with the following:

Let $\chi$ be a table of stochastic edit distance probabilities, and $(s_1, t_1), (s_2, t_2), \ldots, (s_T, t_T)$ denote a set of string pairs over finite alphabet $\Sigma$, where 1 bounds the length of any single string. Next let $E_\chi(s, t)$ denote the stochastic edit distance $-\log_2 \Pr((s, t)|\chi)$. Then:

1. There exists and $O(|s| \cdot |t|)$ time, $O(\min|s|, |t|))$ space algorithm to compute $E_\chi(s, t)$ matching the complexity of the conventional dynamic program.
2. There exists an $O(l^2 T)$ time and space algorithm for production a revised cost table $\chi$ such that:

$$\sum_{i=1}^{T} E_{\chi'}(s_i, t_i) \leq \sum_{i=1}^{T} E_\chi(s_i, t_i)$$

where the inequality is strict unless $\chi$ is already a local maximum, and the sequence of reestimates coverages to a cost table which locally optimizes $E_\chi(s, t)$.

Finite Growth Models as described in NEC Reseach Institute Technical Report No. 96-074 entitled "Finite Growth Models and the Learning of Edit Distance Costs", by E. S. Ristad and P. N. Yianilos may be applied to the problems of computing stochastic edit distance and learning improved costs.

Figure 3:
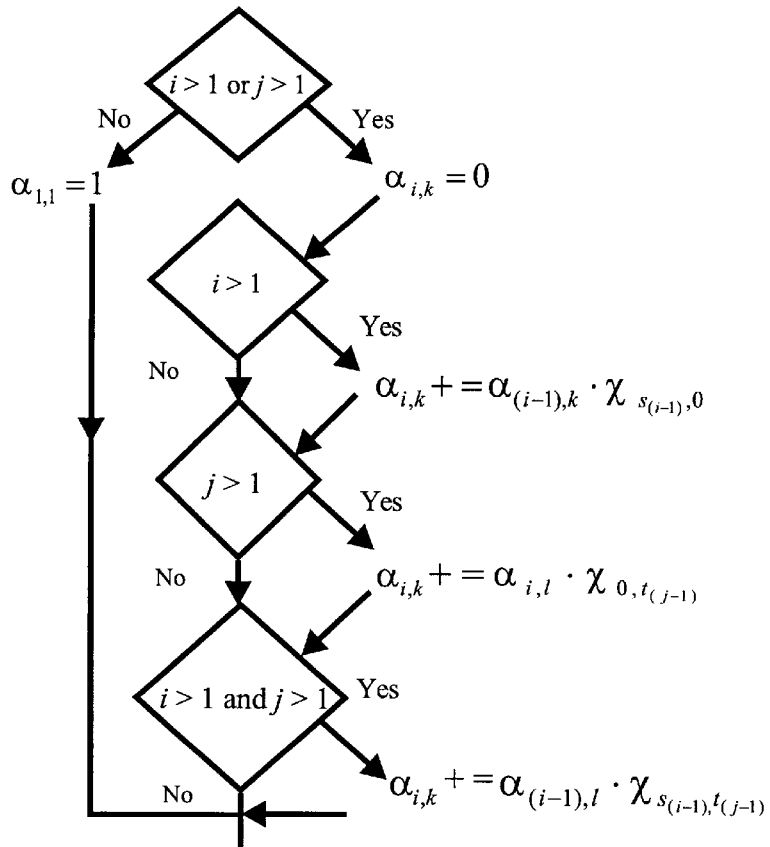
FIG. 3 is a flow chart of the algorithm procedure Evaluate (s, t)

The first result is algorithm 1. The algorithm requires an $(|s|+1) \times 2$ array $\alpha$ of extended exponent range floating point values. Write $\alpha_{i,j}$ to denote an element, where $1 \leq i \leq |s|+1$ and j is 1 or 2. This array corresponds to the vertices within two adjacent columns of the FGM as shown in FIG. 2. The logorithm $E_x$ of the joint probability of s and t is returned rather than the probability itself, so that the caller need not deal with extended range floating point values. As observed by Hall and Dowling, supra, the algorithm's structure resembles that of the standard dynamic program for edit distance. FIG. 3 is a flow chart of algorithm 1, procedure Evaluate (s, t).

Algorithm 1 procedure Evaluate (s, t)
for j=1, . . . , |t|+1
k=2−j mod 2
l=1+j mod 2
for i=1, . . . , |s|+1
if i>1 V j>]
$\alpha_{i,k}=0$
else
$\alpha_{1,1}=1$
if i>1
$\alpha_{i,k}+=\alpha_{(i-1),k} \cdot \chi s_{(i-1)}, 0$
if j>1
$\alpha_{i,k}+=\alpha_{i,l} \cdot \chi 0, t_{(j-1)}$
if i>1 $\wedge$ j>1
$\alpha_{i,k}+=\alpha_{(i-1),l} \cdot \chi s_{(i-1)}, t_{(j-1)}$
return $\log_2 \alpha_{(|s|+1),k}$ Algorithm 2 is the central routine in the stochastic edit distance learning process. It is called repeatedly with pairs of strings. The current cost table $\chi_{ij}$ must be initialized before the first call, and the improved cost table $\bar{\chi}$ must be set to zeros. As each pair is processed, non-negative values are added to locations within $\bar{\chi}$. After all the pairs have been presented, the $\bar{\chi}$ array is simply normalized so that the sum of its entries is one, and then represents the set of improved costs. This entire process may be repeated to further improve the model. That is, $\bar{\chi}$ is copied to $\chi$ and $\bar{\chi}$ is again set to zeros. The sequence of training pairs is then presented again, and so on.

Figure 4A:
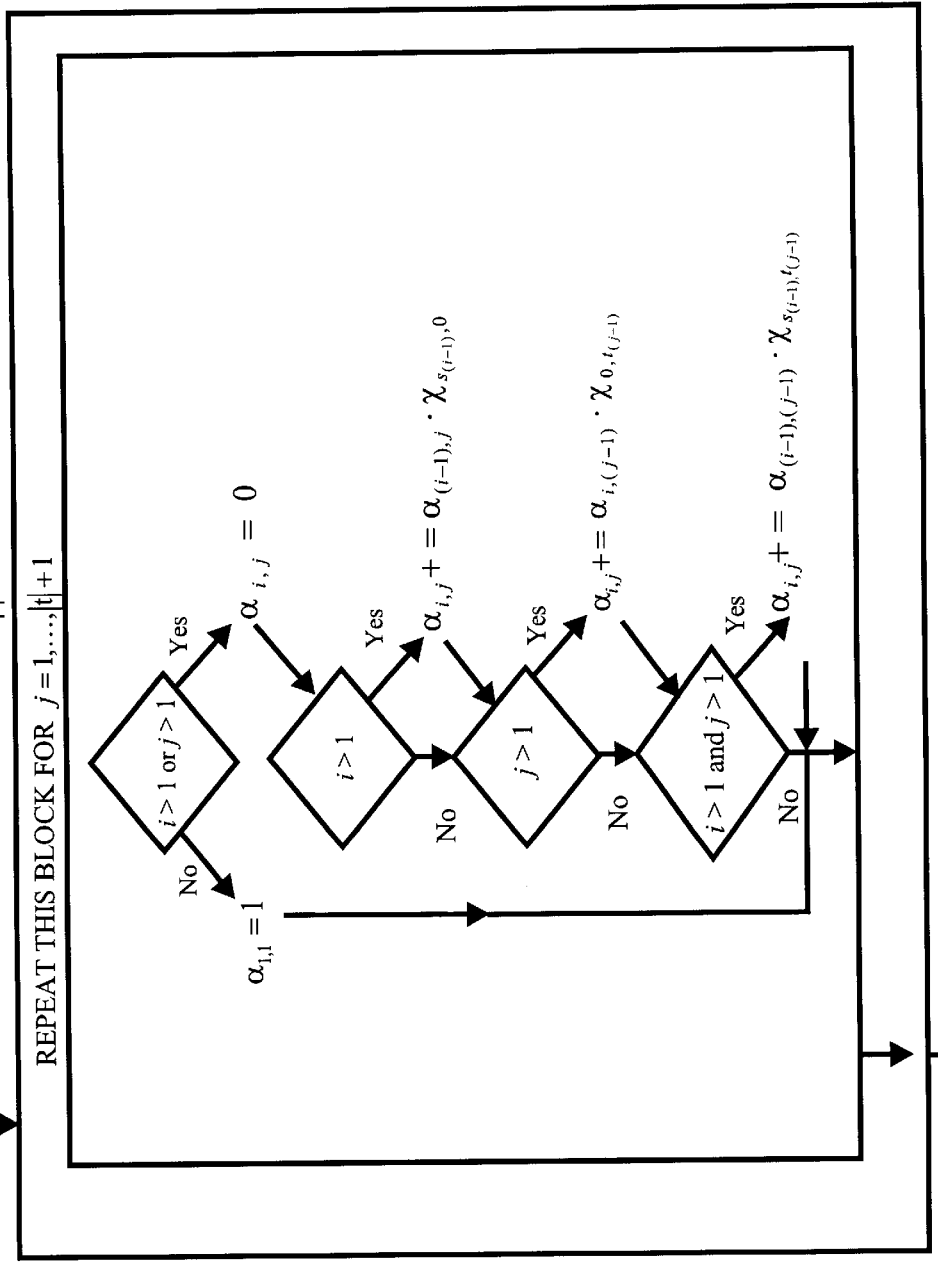
FIGS. 4A and 4B comprise a flow chart of the algorithm procedure LearnCosts(s, t).
Figure 4B:
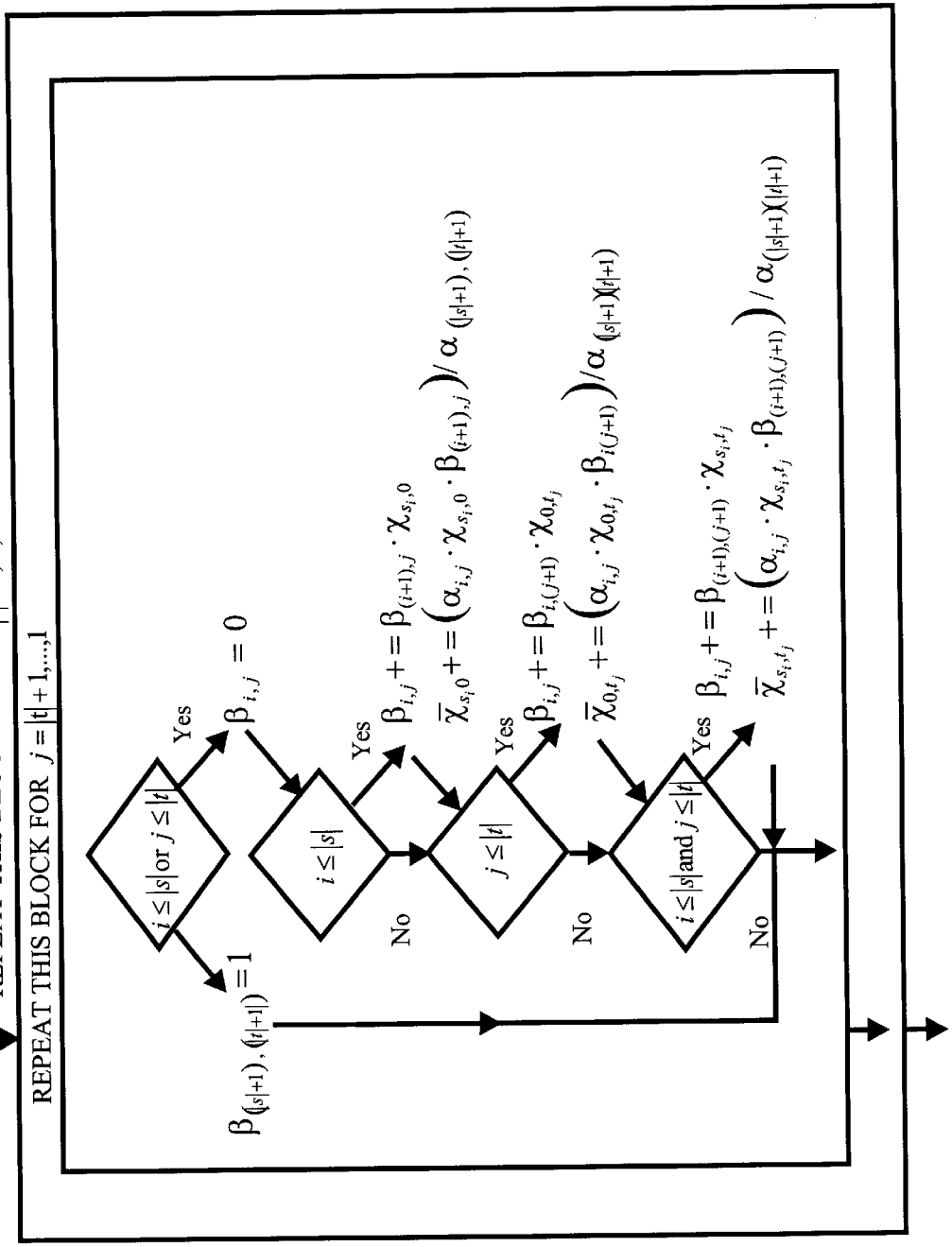

The algorithm uses two work arrays, $\alpha_{ij}$ and $\beta_{ij}$, corresponding to the algorithms 1 and 2 respectively. It is assumed that these arrays are large enough to accommodate the training pairs. They need not be initialized by the caller. As in algorithm 1 it is possible to reduce the size either of $\alpha$ or $\beta$, but not both. Doing so results in a constant 2:1 space savings, but for clarity the algorithm is presented using complete arrays. Finally, the formulation of an algorithms for stochastic string edit distance are readily generalized to continuous observations. FIGS. 4A and 4B combined are a flow chart of algorithm 2, procedure LearnCosts (s, t).

Algorithm 2 procedure LearnCosts(s, t)
for i=1, . . . ,|s|+1
for j=1, . . . ,|t|+1
if i>1 V j>1
$\alpha_{i,j}=0$
else
$\alpha_{1,1}=1$
if i>1
$\alpha_{i,j} += \alpha_{(i-1),j} \cdot \chi s_{(i-1)},0$
if j>1
$\alpha_{i,j} += \alpha_{i,(j-1)} \cdot \chi 0,t_{(j-1)}$
if i>1 $\wedge$ j>1
$\alpha_{i,j} += \alpha_{(i-1),(j-1)} \cdot \chi s_{(i-1)},t_{(j-1)}$
for i=|s|+1, . . . , 1
for j=|t|+1, . . . , 1
if i$\leq$|s| V j$\leq$|t|
$\beta_{i,j}=0$
else
$\beta_{(|s|+1),(|t|+1)}=1$.
if i$\leq$|s|
$\beta_{i,j} += \beta_{(i+1),j} \cdot \chi s_i,0$
$\chi s_i,0 += (\alpha_{i,j} \cdot \chi s_i,0 \cdot \beta_{(i+1),j})/\alpha_{(|s|+1),(|t|+1)}$
if j$\leq$|t|
$\beta_{i,j} += \beta_{i,(j+1)} \cdot \chi 0,t_j$
$\chi 0,t_j += (\alpha_{i,j} \cdot \chi 0,t_j \cdot \beta_{i,(j+1)})/\alpha_{(|s|+1),(|t|+1)}$
if i$\leq$|s| $\wedge$ j$\leq$|t|
$\beta_{i,j} += \beta_{(i-1),(j+1)} \cdot \chi s_i,t_j$
$\chi s_i,t_j += (\alpha_{i,j} \cdot \chi s_i,t_j \cdot \beta_{(i+1),(j+1)})$
$/\alpha_{(|s|+1),(|t|+1)}$ Given a directory of strings, a data processing system can then use the learned edit distance costs to associate new strings with one or more dictionary strings. In this way decisions can be made to guide the system towards some larger goal. For example, each dictionary string may have an associated label. Given a new string without any label, the system might attach the label associated with the nearest dictionary string as measured using the learned edit distance costs. This approach is commonly referred to as nearest neighbor pattern classification.

While there has been described and illustrated a preferred method of learning of edit distance costs, it will be apparent to those skilled in the art that variations and modifications are possible without deviating from the broad principle and spirit of the invention which shall be limited solely by the scope of the claims appended hereto.

What is claimed is:

1. A method of learning edit distance costs of data string pairs in an edit distance system comprising the steps of:
   setting initial edit distance costs for data string pairs;
   receiving a training set of data string pairs;
   learning edit distance costs from their initial costs based on said training set of data, and
   determining the similarity of additional data string pairs based on finding the least costly way to transform a first string of a data string pair into a second string of a data string pair over all of the training set of data string pairs using the learned edit distance costs.

2. A method of optimizing costs in an edit distance system as set forth in claim 1, where said learning edit distance costs is performed by evaluate(s, t) algorithm.

3. A method of optimizing costs in an edit distance system as set forth in claim 2, where said Evaluate(s,t) algorithm is performed by LearnCosts(s, t) algorithm.

4. A method of optimizing costs in an edit distance system as set forth in claim 1, where said learning edit distance costs is performed by LearnCosts(s, t) algorithm.

5. A method for using learned edit distance costs for calculation of distance between strings of data within a pattern classification system comprising the steps of:
   inputting initial edit distance costs for data string pairs;
   receiving a training set of data string pairs;
   learning edit distance costs from the data string pairs initial costs based on said training set of data;
   receiving new string pairs;
   providing a directory of dictionary strings, and
   using the learned edit distance costs for calculating the distance between said new string pairs and the dictionary strings within the pattern classification system for associating new strings with one or more dictionary strings within the pattern classification system.

6. A method of using learned edit distance costs for calculation of distance between string of data within a pattern classification system as set forth in claim 5, where said calculating the distance between said new strings pairs and the dictionary strings is based on nearest neighbor pattern classifications.

7. A method of using learned edit distance costs for calculation of distance between strings of data within a pattern classification system as set forth in claim 5, where said learning edit distance costs is performed by Evaluate (s,t) algorithm.

8. A method of using learned edit distance costs for calculation of distance between string of data within a pattern classification system as set forth in claim 7, where said calculating the distance between said new strings pairs and the dictionary strings is based on nearest neighbor pattern classifications.

9. A method of using learned edit distance costs for calculation of distance between strings of data within a pattern classification system as set forth in claim 7, where said Evaluate(s,t) algorithm is performed by Learned Costs (s, t) algorithm.

10. A method of using learned edit distance costs for calculation of distance between string of data within a pattern classification system as set forth in claim 9, where said calculating the distance between said new strings pairs and the dictionary strings is based on nearest neighbor pattern classifications.

* * * * *